US011693689B2

(12) United States Patent
Ahmed

(10) Patent No.: US 11,693,689 B2
(45) Date of Patent: *Jul. 4, 2023

(54) ONLINE DISK ENCRYPTION USING MIRROR DRIVER

(71) Applicant: VMware, Inc., Palo Alto, CA (US)

(72) Inventor: Mohammed Ahmed, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,684

(22) Filed: Jul. 28, 2022

(65) Prior Publication Data

US 2022/0365807 A1 Nov. 17, 2022

Related U.S. Application Data

(63) Continuation of application No. 16/682,964, filed on Nov. 13, 2019, now Pat. No. 11,436,034.

(51) Int. Cl.
*G06F 9/455* (2018.01)
*G06F 21/60* (2013.01)
*G06F 11/14* (2006.01)
*G06F 8/656* (2018.01)

(52) U.S. Cl.
CPC .......... *G06F 9/45558* (2013.01); *G06F 8/656* (2018.02); *G06F 9/45545* (2013.01); *G06F 11/1484* (2013.01); *G06F 21/602* (2013.01); *G06F 2009/45562* (2013.01); *G06F 2009/45587* (2013.01); *G06F 2201/84* (2013.01); *G06F 2221/2107* (2013.01)

(58) Field of Classification Search
None
See application file for complete search history.

(56) References Cited

U.S. PATENT DOCUMENTS

| 10,848,468 | B1 * | 11/2020 | Lakshman | H04L 67/1097 |
| 2015/0066859 | A1 * | 3/2015 | Blake | G06F 11/1438 |
| | | | | 707/649 |
| 2018/0095775 | A1 * | 4/2018 | Ahmed | G06F 9/45533 |
| 2020/0257814 | A1 * | 8/2020 | El-Moussa | G06F 21/6218 |

\* cited by examiner

*Primary Examiner* — Wynuel S Aquino
(74) *Attorney, Agent, or Firm* — Dinsmore & Shohl LLP

(57) ABSTRACT

Provided are techniques for encrypting a virtual disk of a virtual computing instance (VCI) while the VCI is online and still running using a mirror driver. In certain aspects a mirror driver is a filter running in an I/O stack used for accessing a virtual disk, such that the mirror driver receives I/Os destined to the virtual disk and mirrors those I/Os to the virtual disk and one or more additional virtual disks. The mirror driver begins copying data from an unencrypted source virtual disk to a destination virtual disk, and the data is encrypted as it is stored in the destination virtual disk, while the VCI is still online. During the copying, as new writes are issued to the unencrypted source virtual disk from the VCI, the mirror driver mirrors the writes to both the unencrypted source virtual disk and the destination virtual disk.

20 Claims, 2 Drawing Sheets

ONLINE DISK ENCRYPTION USING MIRROR DRIVER

RELATED APPLICATIONS

The present patent application is a continuation of, and hereby claims priority under 35 U.S.C § 120 to pending U.S. patent application Ser. No. 16/682,964, entitled "Online Disk Encryption Using Mirror Driver," by the same inventor, filed on 13 Nov. 2019, the contents of which are herein incorporated in their entirety by reference for all purposes.

BACKGROUND

Security is an important factor for computing devices. In particular, new vulnerabilities are regularly discovered and exploited to gain access to sensitive data stored on computing devices. One solution for protecting computing devices is to encrypt the disks of computing devices where data is stored.

Virtualizing software (e.g., a hypervisor) running on host computing devices provide a virtual environment for virtual computing instances (VCIs), such as virtual machines (VMs), containers, etc., each of which owns and uses certain resources such as virtual storage, virtual CPUs, and virtual memories along with many other virtual devices that are backed by physical resources of the host computing devices. Certain aspects are described herein with respect to VMs, but may also be applicable to other types of VCIs, or even physical computing devices.

The virtual storage used by VMs may be referred to as virtual disks. The virtual disks may be implemented as files (e.g., vmdk files) stored on physical storage accessible by the host computing devices running the VMs. The virtualization software presents the virtual disk to the VM as a physical disk. Similar to encrypting physical disks for physical computing devices, encrypting a virtual disk for a VM can help protect that data of the VM.

Conventionally, in order to encrypt a virtual disk of a VM, the virtual disk either needs to be initially encrypted when the VM is created, or for an existing VM with an unencrypted virtual disk, the VM needs to be powered off (e.g., stunned) while the unencrypted virtual disk is encrypted. For example, the VM needs to be powered off so that there is no input/output (I/O) to the virtual disk during the encryption process, because any I/O may cause an error in the encryption process. Where the virtual disk is large (e.g., several terabytes), the encryption process could take days, meaning the VM is not available for use for a long period of time, which may not be acceptable to end users. Accordingly, improved techniques for encrypting virtual disks of VMs are needed.

DETAILED DESCRIPTION

Embodiments herein provide techniques for encrypting a virtual disk of a VM while the VM is online and still running (e.g., is not powered off) using a mirror driver. In certain aspects a mirror driver is a filter (e.g., software) running in the I/O stack (e.g., in a hypervisor) used for accessing a virtual disk, such that the mirror driver receives I/Os destined to the virtual disk and copies or mirrors those I/Os to the virtual disk and one or more additional virtual disks. Such techniques provide a technical solution to the technical problem of how to encrypt virtual disks while there are ongoing I/Os to the virtual disks. In particular, in certain embodiments, for an unencrypted virtual disk (referred to as an unencrypted source virtual disk) of a VM, a new virtual disk (referred to as a destination virtual disk) is created (e.g., without any stored data). Further, a mirror driver is installed with respect to the destination virtual disk, and the unencrypted source virtual disk. The mirror driver begins copying data (e.g., block by block) from the unencrypted source virtual disk to the destination virtual disk, and the data is encrypted (e.g., block by block) as it is stored in the destination virtual disk, while the VM is still online. In addition, during the copying, as new I/Os (e.g., writes) are issued to the unencrypted source virtual disk from the online VM, the mirror driver mirrors or copies the new I/Os to both the unencrypted source virtual disk and the destination virtual disk, so that the new I/Os are performed on both the unencrypted source virtual disk and the destination virtual disk. The block(s) affected by the new I/Os are not encrypted on the unencrypted source virtual disk, but are encrypted on the destination virtual disk. The process continues until copying of data from the unencrypted source virtual disk to the destination virtual disk is complete. The VM is then switched from using the unencrypted source virtual disk to instead using the encrypted destination virtual disk as its virtual storage. Accordingly, the VM now has an encrypted virtual disk with the same data as the unencrypted virtual disk, and that also is updated with any I/Os occurring while the VM was online during the encryption process.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
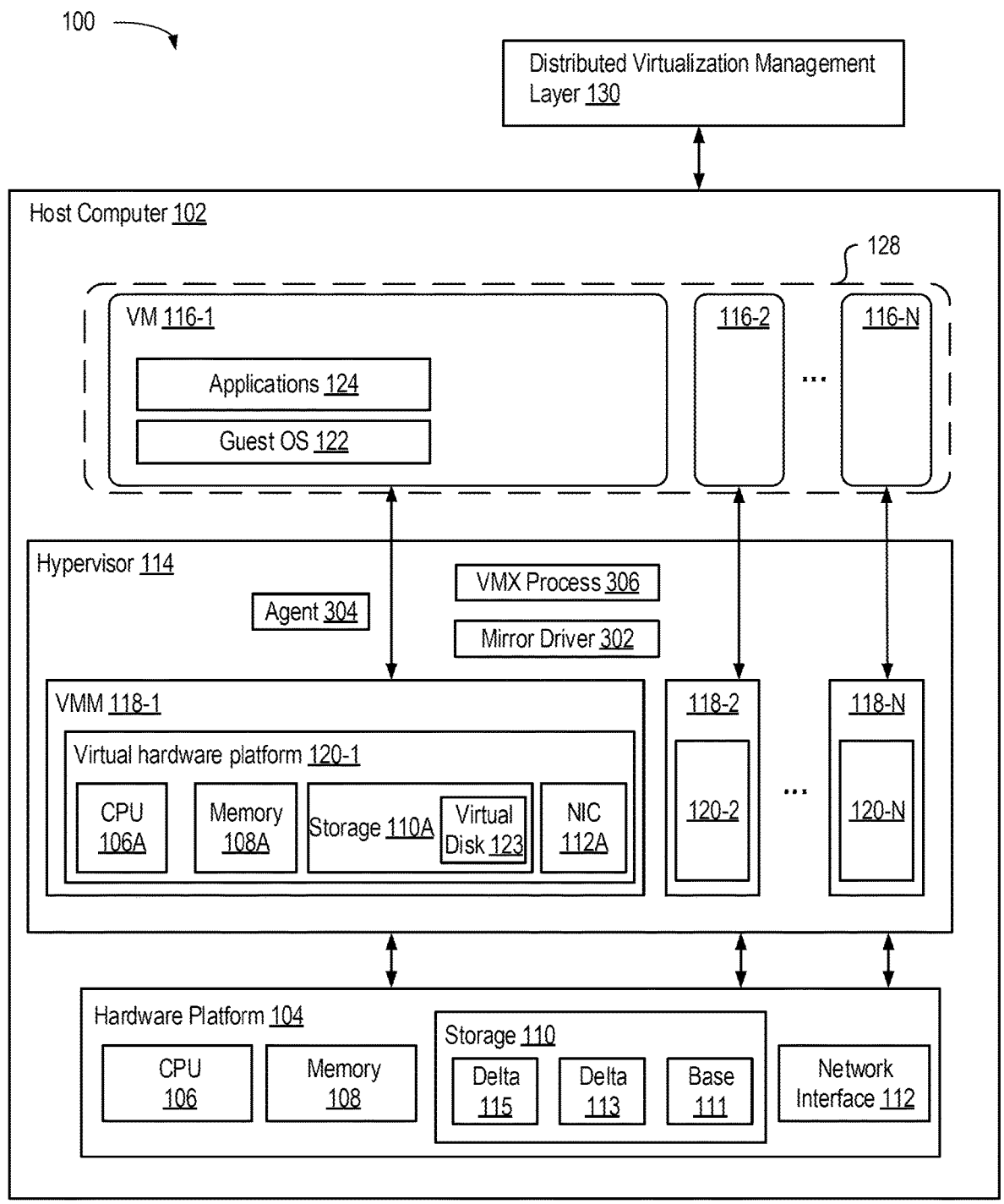
FIG. 1 illustrates a computing system for encrypting a virtual disk according to an embodiment.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple resource consumers, such as virtual machines (VMs) 116 (or more generally referred to as "virtual computing instances") that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128. Virtual storage 110A may include one or more virtual disks, such as virtual disk 123, and hypervisor 114 provisions the virtual disk 123 as one or more files (e.g., files 111, 113, 115) in a file system managed by hypervisor 114.

In some embodiments, the virtual disk, such as virtual disk 123, of a VM is implemented as a single virtual disk file, which may be referred to as a base virtual disk file, such as base virtual disk file 111 shown stored on storage 110.

In some embodiments, the virtual disk, such as virtual disk 123, of a VM is implemented as a base virtual disk file, such as base virtual disk file 111, and one or more delta disk files, such as delta disk files 113, 115. For example, virtualizing software, such as hypervisor 114 (e.g., as directed by distributed virtualization management layer 130), may provide a way for taking and restoring snapshots (e.g., backups) of the VMs 116 running on the hypervisor 114. For example, the virtualizing software takes an initial snapshot of a VM 116 and stores the virtual disk 123 of the VM 116 as a base virtual disk file 111 that contains all the data of the VM 116 at the time of the snapshot. As part of taking the snapshot, the virtualizing software further creates a delta virtual disk file 113 (e.g., without any stored data). After the snapshot is taken, any further writes to the virtual disk 123 are written by the virtualizing software to the active delta virtual disk file 113, while the base virtual disk file 111 remains unchanged. If a subsequent snapshot is taken, the virtualizing software stores the virtual disk 123 of the VM 116 as the base virtual disk file 111 and the delta virtual disk file 113 (or as a new base virtual disk file) that contains all the data of the VM 116 at the time of the subsequent snapshot. The virtualizing software then creates another delta virtual disk file 115 as the active delta virtual disk file. The process may be repeated, with any number of snapshots being taken, thereby generating any number of delta disk files for the virtual disk. A base virtual disk file and one or more inactive delta virtual disks files accordingly may also be referred to as one or more snapshots.

Hypervisor 114 may run on top of a host operating system of host 102 or directly on hardware components of host 102. Each VM 116 includes a guest operating system 122 (e.g., Microsoft Windows®, Linux™) and one or more guest applications 124 and processes running on top of guest operating system 122. Hypervisor 114 further comprises mirror driver 302, which is described in further detail below. The mirror driver 302 is a filter placed on the I/O stack. Agent 304 is also illustrated in hypervisor 114. Agent 304 coordinates operations that support the methods described herein. Hypervisor 114 further comprises a virtual machine executable (VMX) process/thread 306 for implementing certain aspects of encrypting a virtual disk according to embodiments described herein. VMX process 306 may be a component/process of VM 116-1. For example, each VM 116 may have one or more VMX processes.

Computing system 100 includes distributed virtualization management layer 130 that communicates with the one or more hosts 102. Distributed virtualization management layer 130 is configured to carry out administrative tasks for the computing system 100, including managing hosts 102, managing VMs running within each host 102, provisioning VMs, migrating VMs from one host to another host, and load balancing between hosts 102. In one embodiment, distributed virtualization management layer 130 is a computer program that resides and executes in a central server, which may reside in computing system 100, or alternatively, running as a VM in one of hosts 102. A distributed virtualization management layer 130 may comprise a distributed architecture made up of a plurality of nodes. Nodes can comprise microservices, VMs, or containers, or other resource consumers running on hosts in some embodiments.

Figure 2:
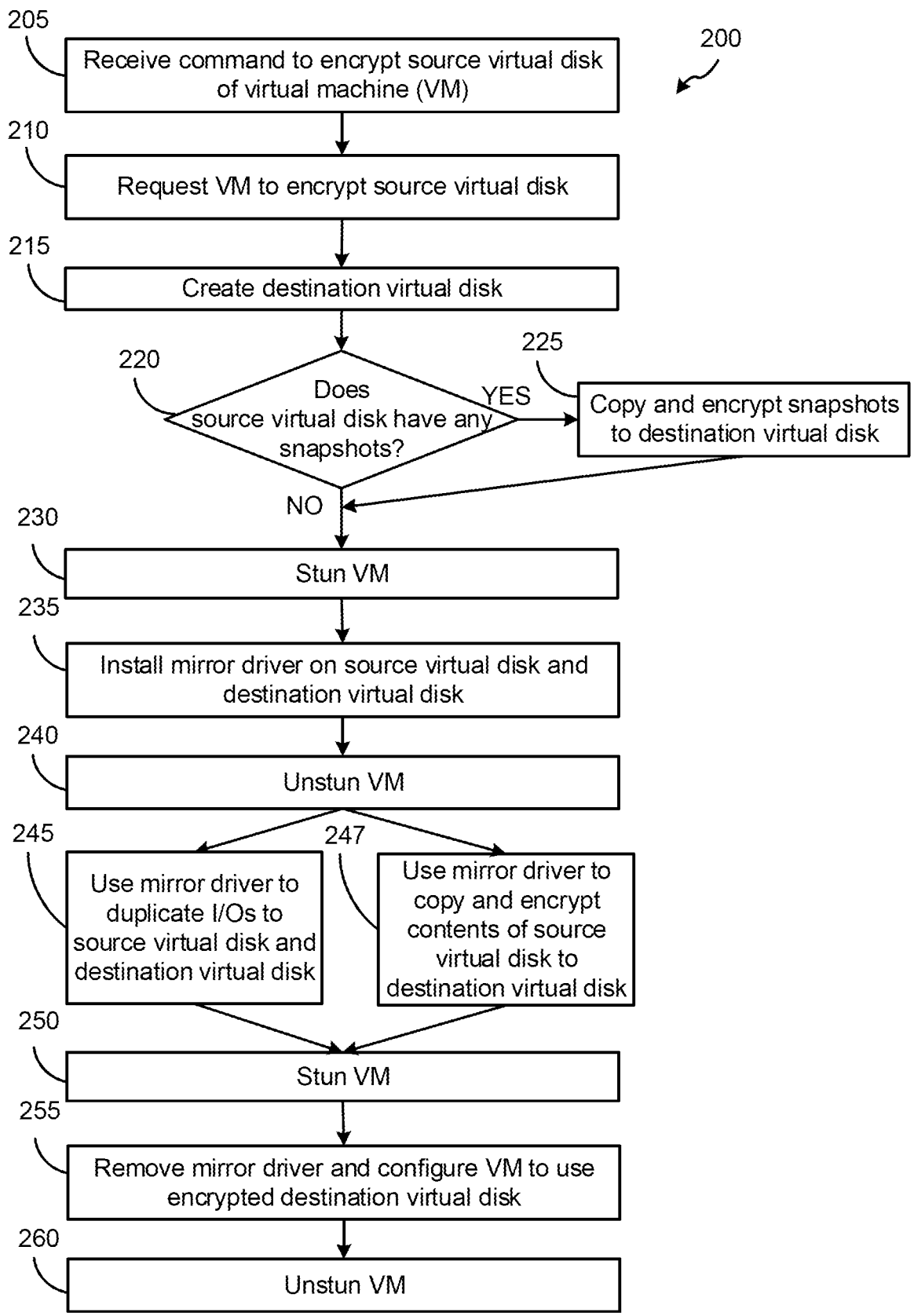
FIG. 2 is a flowchart illustrating a method for encrypting a virtual disk in accordance with an embodiment.

One method for encrypting a virtual disk is to use a mirror driver. FIG. 2 illustrates a method 200 for encrypting a virtual disk using a mirror driver. Although the method steps are described in conjunction with FIG. 1, persons skilled in the art will understand that any system configured to perform the method steps, in any feasible order, falls within the scope of the present invention. In various embodiments, the hardware and/or software elements described in FIG. 1 can be configured to perform the method steps of FIG. 2.

At step 205, hypervisor 114, such as agent 304 (e.g., a host daemon) operating in hypervisor 114, receives from distributed virtualization management layer 130 (e.g., via a network) a command to encrypt an unencrypted source virtual disk corresponding to virtual storage 110A of VM 116-1. For example, an administrator may issue such a command using a UI to interface with distributed virtualization management layer 130, or the command may be automatically issued based on one or more rules. In some embodiments, agent 304 itself, or another entity, initiates the encryption.

At step 210, the agent 304, such as based on receiving the command, requests VM 116-1 to encrypt the unencrypted source virtual disk, such as via a messaging channel between the agent 304 and VM 116-1, or a system call. For example, the agent 304 requests VMX process 306 of VM 116-1 to encrypt the unencrypted source virtual disk.

At step 215, the VMX process 306 creates a new destination virtual disk. For example, the VMX process 306 creates an active destination virtual disk file (e.g., without any stored data) corresponding to the destination virtual disk. The active destination virtual disk file may be stored on any suitable physical storage, such as the same physical storage as virtual disk file(s) of the unencrypted source virtual disk.

Continuing, at step 220, VMX process 306 determines if any snapshots exist for the unencrypted source virtual disk. For example, the VMX process 306 accesses metadata associated with the unencrypted source virtual disk that indicates the virtual disk file(s) that implement the unencrypted source virtual disk. In some embodiments, if the unencrypted source virtual disk is implemented by multiple virtual disk files, such as a base virtual disk file and one or more inactive delta virtual disk files representing one or more snapshots of the unencrypted source virtual disk and an active delta virtual disk file to which writes are currently written, the VMX process 306 determines one or more snapshots exist. If no snapshots exist of the unencrypted source virtual disk, method 200 proceeds to step 230.

If VMX process 306 determines one or more snapshots exist, at step 225, a base virtual disk file and one or more inactive delta virtual disk files representing one or more snapshots of the unencrypted source virtual disk are copied, and the copies encrypted by VMX process 306. The copies may be encrypted using any suitable encryption technique (e.g., data encryption standard (DES)), advanced encryption standard (AES), MD5, SHA1, etc.). The encrypted copies of the base virtual disk file and one or more inactive delta virtual disk files are associated with the destination virtual disk by the VMX process 306 (e.g., by updating metadata associated with the destination virtual disk), and may be stored on any suitable physical storage, such as the same physical storage as the virtual disk files of the unencrypted source virtual disk. Accordingly, the encrypted copies of the base virtual disk file and one or more inactive delta virtual disk files, along with the active destination virtual disk file, represent/implement the destination virtual disk corresponding to an encrypted version of the unencrypted source virtual disk.

In certain embodiments, steps 220-225 are optional. It should be noted that VM 116-1 may continue to be online during the performance of steps 205-225.

Continuing, at step 230, VMX process 306 stuns (e.g., powers off, pauses the operation of, etc.) VM 116-1. A stun operation pauses the execution of the VM at an instruction boundary and allows in-flight I/Os to complete. While the VM is stunned, subsequent I/Os are quiesced (i.e., the I/Os are temporarily paused). Stunning a VM allows a number of different operations to be performed, such as creating or consolidating snapshots. In this embodiment, stunning allows the mirror driver 302 to be installed. As is discussed, another stun operation is performed to remove mirror driver 302 when the virtual disk encryption operation is complete.

Further, at step 235, VMX process 306 installs/configures mirror driver 302 on the unencrypted source virtual disk and the destination virtual disk. Accordingly, the mirror driver 302 is configured to receive I/Os made to the unencrypted source virtual disk and process the I/Os as further discussed.

At step 240, VMX process 306 unstuns (e.g., powers on, resumes operation of, etc.) VM 116-1. Accordingly, VM 116-1 can resume issuing I/Os to the unencrypted source virtual disk.

Continuing at step 245, after installation of the mirror driver 302, mirror driver 302 receives I/Os to unencrypted source virtual disk and duplicates (e.g., copies, mirrors, etc.) any I/Os (e.g., the writes) received to both the unencrypted source virtual disk and the destination virtual disk. For example, for a received write command, the mirror driver 302 issues a write command to the active base virtual disk file or delta virtual disk file of the unencrypted source virtual disk that currently handles writes, and the write command is executed by writing data (e.g., unencrypted) corresponding to the write command to the active base virtual disk file or delta virtual disk file. Further, the mirror driver 302 issues the write command to the active destination virtual disk file of the destination virtual disk, and the write command is executed by writing data, which is encrypted, corresponding to the write command to the active destination virtual disk file. The data may be encrypted, such as using an appropriate encryption technique as discussed, and written to the active destination virtual disk file using an appropriate encryption module (e.g., VMcrypt IOFilter) that is part of the I/O stack. The active destination virtual disk file may be a base virtual disk file (e.g., if there are no other snapshots as determined in step 220) or a delta virtual disk file (e.g., if there are other snapshots as determined in step 220).

In addition, at step 247, which may be performed in parallel with step 245, mirror driver 302 copies the contents of the unencrypted source virtual disk to the destination virtual disk and encrypts the copied contents. For example, mirror driver 302 creates a copy of the contents (e.g., block by block) of the active base virtual disk file or delta virtual disk file of the unencrypted source virtual disk, encrypts the contents (e.g., block by block), and stores the encrypted copy of the contents (e.g., block by block) to the active destination virtual disk file of the destination virtual disk.

Thus, during the copying and encrypting process, VM 116-1 continues to operate normally, including issuing write I/Os to the unencrypted source virtual disk, which the mirror driver 302 mirrors to both the unencrypted source virtual disk and the destination virtual disk as discussed. Further, if the VM 116-1 issues read I/Os to the unencrypted source virtual disk, they may be sent by mirror driver 302 only to the unencrypted source virtual disk, which is the working virtual disk of VM 116-1 until completion of step 255 as discussed. Thus, VM 116-1 does not experience downtime during copying and encrypting.

In certain aspects, if VM 116-1 is powered down or suspended at some point during step 247, step 247 continues to be performed by mirror driver 302, meaning the mirror driver 302 copies the contents of the unencrypted source virtual disk to the destination virtual disk and encrypts the copied contents. Further, step 245 may not be performed during this time as there would be no I/Os issued by VM 116-1 to the unencrypted source virtual disk.

In certain aspects, if VM 116-1 is moved to another host machine during step 247, the unencrypted source virtual disk and the partially generated destination virtual disk are also moved to the other host. Further, the mirror driver 302 is setup on the other host and the process resumed on the other host.

After copying of the contents of the unencrypted source virtual disk to the destination virtual disk is complete at step 247, the destination virtual disk is an encrypted version of the unencrypted source virtual disk. The copying may be deemed complete when all blocks of the active base virtual disk file or delta virtual disk file of the unencrypted source virtual disk have been copied to the active destination virtual disk file. The mirror driver 302 keeps tracks of which blocks have been copied and determines if the copying is complete or not.

At step 250, after the copying of the contents of the unencrypted source virtual disk to the destination virtual disk is complete, the mirror driver 302 indicates to the VMX process 306 that the copying is complete, and the VMX process 306 stuns the VM 116-1 so that the mirror driver can be removed.

At step 255, the VMX process 306 removes the mirror driver 302 from the unencrypted source virtual disk and the destination virtual disk, and switches or configures the VM 116-1 to use the destination virtual disk as its virtual disk instead of the unencrypted source virtual disk, such as by setting metadata or configuration files of the VM 116-1 accordingly. At step 260, the VMX process 306 unstuns the VM 116-1, and thus the VM 116-1 resumes issuing I/Os, but now to the encrypted destination virtual disk instead of the unencrypted source virtual disk. Thus VM 116-1 has an encrypted virtual disk with the same data as the original unencrypted virtual disk, and that also is updated with any I/Os occurring while the VM 116-1 was online during the encryption process. In some cases, unencrypted source virtual disk may be deleted.

Accordingly, in method 200, the VM 116-1 is only stunned during installation and removal of the mirror driver 302 (steps 235 and 255). The VM 116-1 is online for the remainder of method 200, thereby allowing for the virtual disk of VM 116-1 to be encrypted with limited downtime for VM 116-1.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for encrypting an unencrypted source virtual disk of a virtual computing instance (VCI), the method comprising:

copying and encrypting contents of the unencrypted source virtual disk to a destination virtual disk; and during the copying and encrypting:
  mirroring write commands issued to the unencrypted source virtual disk to both the unencrypted source virtual disk and the destination virtual disk;
  executing the mirrored write commands on the unencrypted source virtual disk by writing data corresponding to the write commands to the unencrypted source virtual disk as unencrypted data; and
  executing the mirrored write commands on the destination virtual disk by encrypting data corresponding to the write commands and writing the encrypted data to the destination virtual disk, wherein the copying and encrypting contents of the unencrypted source virtual disk to the destination virtual disk comprises:
    associating encrypted contents of an active delta virtual disk file of the unencrypted source virtual disk and encrypted contents of one or more inactive delta virtual disk files of the unencrypted source virtual disk with the destination virtual disk; and
    subsequent to the associating the encrypted contents, configuring the virtual computing instance to use the destination virtual disk by setting metadata of the virtual computing instance.

2. The method of claim 1, wherein the copying and encrypting is performed while the VCI is online.

3. The method of claim 1, further comprising installing a mirror driver on the unencrypted source virtual disk and the destination virtual disk, wherein the mirror driver is configured to perform the mirroring.

4. The method of claim 3, further comprising removing the mirror driver after the copying and encrypting is complete.

5. The method of claim 4, wherein the VCI is stunned during installing the mirror driver and removing the mirror driver.

6. The method of claim 1, wherein the unencrypted source virtual disk is implemented as one or more snapshots and the active delta virtual disk file.

7. The method of claim 6, further comprising determining the one or more snapshots exist as the one or more inactive delta virtual disk files.

8. A system for encrypting an unencrypted source virtual disk of a virtual computing instance (VCI), the system comprising:
  at least one memory; and
  at least one processor coupled to the at least one memory, the at least one processor and the at least one memory configured to:
    copy and encrypting contents of the unencrypted source virtual disk to a destination virtual disk; and
    during the copying and encrypting:
      mirror write commands issued to the unencrypted source virtual disk to both the unencrypted source virtual disk and the destination virtual disk;
      execute the mirrored write commands on the unencrypted source virtual disk by writing data corresponding to the write commands to the unencrypted source virtual disk as unencrypted data; and
      execute the mirrored write commands on the destination virtual disk by encrypting data corresponding to the write commands and writing the encrypted data to the destination virtual disk, wherein the copying and encrypting contents of the unencrypted source virtual disk to the destination virtual disk comprises:
        associating encrypted contents of an active delta virtual disk file of the unencrypted source virtual disk and encrypted contents of one or more inactive delta virtual disk files of the unencrypted source virtual disk with the destination virtual disk; and
        subsequent to the associating the encrypted contents, configuring the virtual computing instance to use the destination virtual disk by setting metadata of the virtual computing instance.

9. The system of claim 8, wherein the copying and encrypting is performed while the VCI is online.

10. The system of claim 8, wherein the at least one processor and the at least one memory are further configured to install a mirror driver on the unencrypted source virtual disk and the destination virtual disk, wherein the mirror driver is configured to perform the mirroring.

11. The system of claim 10, wherein the at least one processor and the at least one memory are further configured to remove the mirror driver after the copying and encrypting is complete.

12. The system of claim 11, wherein the VCI is stunned during installing the mirror driver and removing the mirror driver.

13. The system of claim 8, wherein the unencrypted source virtual disk is implemented as one or more snapshots and the active delta virtual disk file.

14. The system of claim 13, wherein the at least one processor and the at least one memory are further configured to determine the one or more snapshots exist as the one or more inactive delta virtual disk files.

15. A non-transitory computer-readable medium storing instructions that, when executed by one or more processors, cause the one or more processors to:
  copy and encrypting contents of an unencrypted source virtual disk of a virtual computing instance (VCI) to a destination virtual disk; and
  during the copying and encrypting:
    mirror write commands issued to the unencrypted source virtual disk to both the unencrypted source virtual disk and the destination virtual disk;
    execute the mirrored write commands on the unencrypted source virtual disk by writing data corresponding to the write commands to the unencrypted source virtual disk as unencrypted data; and
    execute the mirrored write commands on the destination virtual disk by encrypting data corresponding to the write commands and writing the encrypted data to the destination virtual disk, wherein the copying and encrypting contents of the unencrypted source virtual disk to the destination virtual disk comprises:
      associating encrypted contents of an active delta virtual disk file of the unencrypted source virtual disk and encrypted contents of one or more inactive delta virtual disk files of the unencrypted source virtual disk with the destination virtual disk; and
      subsequent to the associating the encrypted contents, configuring the virtual computing instance to use the destination virtual disk by setting metadata of the virtual computing instance.

16. The non-transitory computer-readable medium of claim 15, wherein the copying and encrypting is performed while the VCI is online.

17. The non-transitory computer-readable medium of claim 15, wherein the instructions, when executed by the one or more processors, further cause the one or more processors to install a mirror driver on the unencrypted source virtual disk and the destination virtual disk, wherein the mirror driver is configured to perform the mirroring.

18. The non-transitory computer-readable medium of claim 17, wherein the instructions, when executed by the one or more processors, further cause the one or more processors to remove the mirror driver after the copying and encrypting is complete.

19. The non-transitory computer-readable medium of claim 18, wherein the VCI is stunned during installing the mirror driver and removing the mirror driver.

20. The non-transitory computer-readable medium of claim 15, wherein the unencrypted source virtual disk is implemented as one or more snapshots and the active delta virtual disk file.

\* \* \* \* \*